(12) United States Patent
Sutton

(10) Patent No.: US 12,315,087 B2
(45) Date of Patent: May 27, 2025

(54) INTERACTIVE AUGMENTED REALITY TROPHY SYSTEM

(71) Applicant: Sony Interactive Entertainment Inc., Tokyo (JP)

(72) Inventor: Ryan Sutton, Venice, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 71 days.

(21) Appl. No.: 17/945,964

(22) Filed: Sep. 15, 2022

(65) Prior Publication Data
US 2024/0096030 A1    Mar. 21, 2024

(51) Int. Cl.
*G06T 19/00*    (2011.01)
*G06T 17/20*    (2006.01)

(52) U.S. Cl.
CPC ............ *G06T 19/006* (2013.01); *G06T 17/20* (2013.01)

(58) Field of Classification Search
CPC .................................................... G06T 19/006
See application file for complete search history.

(56) References Cited

U.S. PATENT DOCUMENTS

| | | | |
|---|---|---|---|
| 2011/0207525 A1 | 8/2011 | Allen et al. | |
| 2011/0269540 A1* | 11/2011 | Gillo | A63F 13/57 463/31 |
| 2011/0300926 A1 | 12/2011 | Englman et al. | |
| 2015/0098607 A1* | 4/2015 | Chow | G06T 19/006 382/103 |
| 2017/0132842 A1* | 5/2017 | Morrison | G06F 3/04815 |
| 2019/0197590 A1 | 6/2019 | Borchetta et al. | |
| 2019/0282906 A1 | 9/2019 | Yong | |
| 2019/0392640 A1 | 12/2019 | Qian et al. | |
| 2022/0232104 A1* | 7/2022 | Brimhall | H04L 67/131 |
| 2023/0360027 A1* | 11/2023 | Jain | G06Q 20/367 |

OTHER PUBLICATIONS

International Search Report and Written Opinion for International Application No. PCT/US2023/028614, dated Nov. 8, 2023.
Livewire Digital, "Digital Trophy Case Interactive Hall of Fame Overview v2" Youtube Video Oct, 19, 2021. Retrieved on Sep. 19, 2023. Retrieved from , see entire video.

* cited by examiner

*Primary Examiner* — Ryan McCulley
(74) *Attorney, Agent, or Firm* — Kilpatrick Townsend & Stockton LLP

(57) ABSTRACT

Interactive display of virtual trophies includes scanning a surface for one or more location anchor points. A trophy rack location is determined using the location anchor points. A trophy rack mesh is applied over an image frame of the surface using the determined trophy rack location. One or more trophy models are displayed over the trophy rack mesh with a display device. A trophy rack layout is generated information from the one or more trophy models and the trophy rack mesh and finally the trophy rack layout information is stored or transmitted.

19 Claims, 11 Drawing Sheets

INTERACTIVE AUGMENTED REALITY TROPHY SYSTEM

FIELD OF THE DISCLOSURE

Aspects of the present disclosure relate to video gaming and more specifically to trophy systems for video gaming.

BACKGROUND OF THE DISCLOSURE

Many applications include achievements or milestones representing minor and major goals set by the application developer for the user. Often achievements and milestones are represented by small icons on an achievement page showing the user's accomplishment. While a user's achievement page is often viewable by other users, small icons fail to impressively represent the difficulty and significance of the achievements and milestones. Additionally, electronic sports (eSports) are becoming a popular entertainment attraction and winning an eSport event is a major accomplishment. Often eSport event winners are awarded with prizes and a physical trophy. Physical trophies are inconvenient for others to view as fans and friends must be physically present to view the physical trophy.

Currently there are several methods which may provide users with the experience of being virtually present while they are physically remote. These virtual immersive experiences include augmented reality and virtual reality.

Augmented reality (AR) is an interactive experience of a real-world environment where objects that reside in the real world are enhanced by computer-generated perceptual information, sometimes across multiple sensory modalities, including visual, auditory, haptic, somatosensory, and olfactory. AR may incorporate three basic features: a combination of real and virtual worlds, real-time interaction, and accurate 3D registration of virtual and real objects. This experience is seamlessly interwoven with the physical world such that it is perceived as an aspect of the real environment via a suitably configured interface. As such, augmented reality alters one's ongoing perception of a real-world environment. Augmented reality may also be referred to as mixed reality.

By contrast, in virtual reality (VR) the users' perception of reality is completely based on virtual information. Thus, in VR the user is provided with a completely virtual environment designed by the application developer. As such currently VR provides a less realistic feeling environment when compared to AR.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE SPECIFIC EMBODIMENTS

Figure 1:
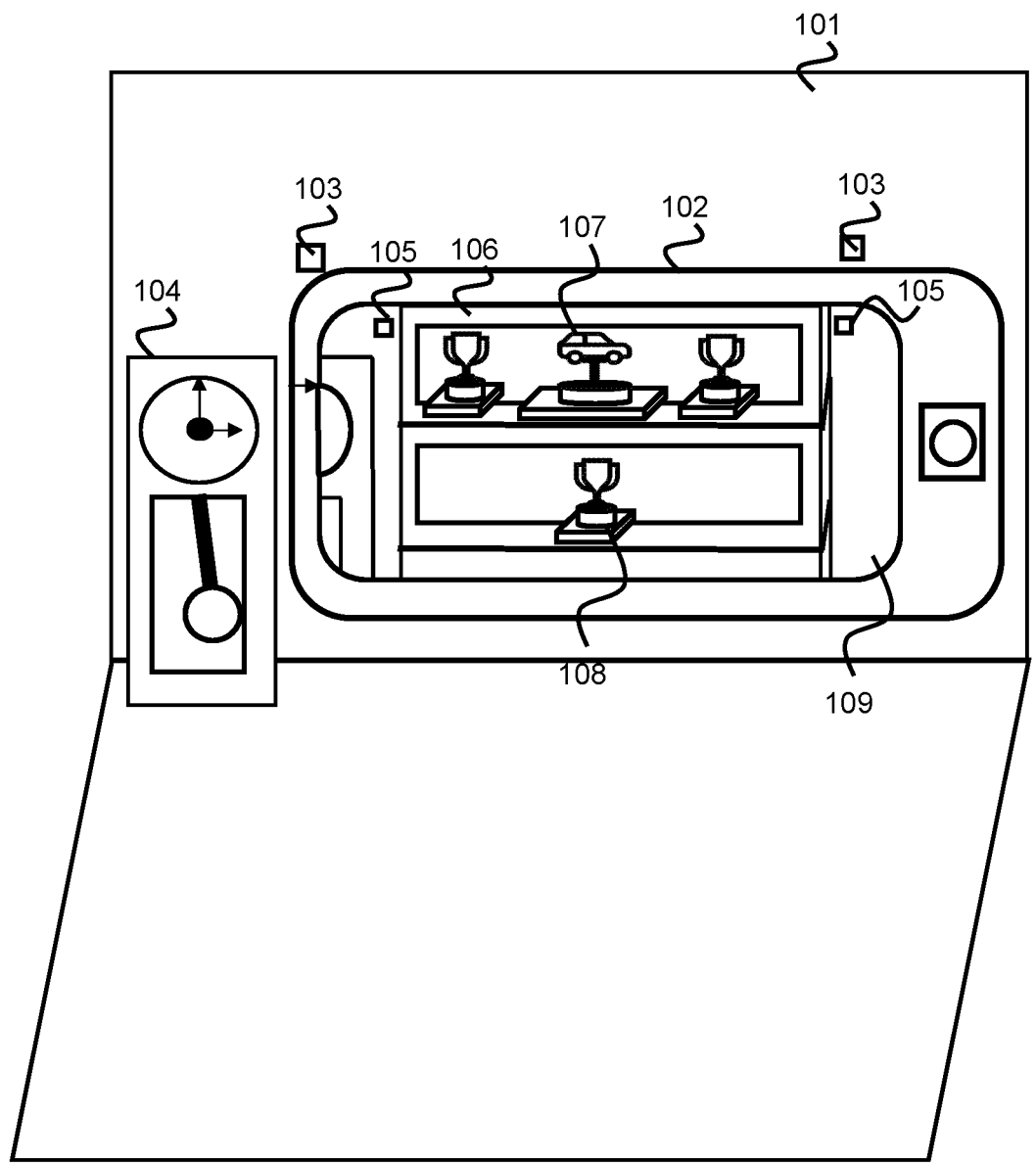
FIG. 1 is a pictorial diagram showing an implementation of an interactive augmented reality trophy system according to aspects of the present disclosure.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

While numerous specific details are set forth in order to provide a thorough understanding of embodiments of the disclosure, it will be understood by those skilled in the art that other embodiments may be practiced without these specific details. In other instances, well-known methods, procedures, components, and circuits have not been described in detail so as not to obscure the present disclosure. Some portions of the description herein are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An "algorithm", as used herein, is a self-consistent sequence of actions or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

As used herein, "electromagnetic radiation" refers of waves of the electromagnetic field, propagating through space, carrying electromagnetic radiant energy. Electromagnetic radiation includes radio waves, microwaves, infrared, (visible) light, ultraviolet, X-rays, and gamma rays, which collectively form part of the electromagnetic spectrum. As used herein, "electromagnetic signals" refers to electromagnetic radiation that is modulated to encode information. Examples of modulation include amplitude modulation, frequency modulation, phase modulation, pulse code modulation, pulse width modulation and the like.

Unless specifically stated or otherwise as apparent from the following discussion, it is to be appreciated that throughout the description, discussions utilizing terms such as "processing", "computing", "converting", "reconciling", "determining" or "identifying," refer to the actions and processes of a computer platform which is an electronic computing device that includes a processor which manipulates and transforms data represented as physical (e.g., electronic) quantities within the processor's registers and accessible platform memories into other data similarly represented as physical quantities within the computer platform memories, processor registers, or display screen.

A computer program may be stored in a computer readable storage medium, such as, but not limited to, any type of disk including floppy disks, optical disks (e.g., compact disc read only memory (CD-ROMs), digital video discs (DVDs), Blu-Ray Discs™, etc.), and magnetic-optical disks, read-only memories (ROMs), random access memories (RAMs), EPROMs, EEPROMs, magnetic or optical cards, flash memories, or any other type of non-transitory media suitable for storing electronic instructions.

The terms "coupled" and "connected," along with their derivatives, may be used herein to describe structural relationships between components of the apparatus for performing the operations herein. It should be understood that these terms are not intended as synonyms for each other. Rather, in particular embodiments, "connected" may be used to indicate that two or more elements are in direct physical or electrical contact with each other. In some instances, "connected", "connection", and their derivatives are used to indicate a logical relationship, e.g., between node layers in a neural network (NN). "Coupled" may be used to indicated that two or more elements are in either direct or indirect (with other intervening elements between them) physical or electrical contact with each other, and/or that the two or more elements co-operate or communicate with each other (e.g., as in a cause an effect relationship).

INTRODUCTION

According to aspects of the present disclosure providing users with a shareable and immersive experience of their virtual world achievements may be accomplished through the use of AR. AR may provide users with virtual trophies signifying their accomplishments that they can touch, hold, manipulate, or even throw against a surface in a realistic environment.

FIG. 1 is a pictorial diagram showing an implementation of an interactive augmented reality trophy system according to aspects of the present disclosure. As shown, a surface 101 may be displayed as an image frame with a display device 102 and a trophy rack mesh 106 may be displayed over the image frame of the surface 109. Here, the trophy rack mesh 106 is a skinned trophy rack model. In the implementation shown, the surface 101 is a wall and display of the trophy rack mesh 106 over the image frame of the surface is aided by the placement of one or more landmarks 103 which act as location anchor points. The image frame of the surface 101 may also include other objects 104 that may be in view of the interactive augmented reality trophy system. The one or more landmarks 103 may be, for example and without limitation, one or more stickers or other labels bearing a fiducial marker, a transmitter configured to emit electromagnetic radiation or a sound signal detectable by the augmented reality system, a physical object recognizable by the augmented reality system or any combination thereof.

Trophy models 108 and 109 are displayed over the trophy rack mash 106. For example, and without limitation the trophy models 108 and 109 may be displayed such that they appear to be sitting on a shelf of the trophy rack mesh and, as such, ancillary effects may be added to the trophy rack model or over a surface underlying the trophy rack mesh. The ancillary effects may include for example and without limitation, one or more of shadows, lighting effects, dust displacement, dust particles and similar. In the example shown, two different types of trophy models are shown, a first type of trophy may be an achievement trophy 108. Achievement trophy models may all have a similar model with information differentiating each of the achievement trophy models 108 displayed on the model and/or listed in information associated with the model. The second type of trophy 107 shown is a custom trophy model. Custom trophy models 107 may include a custom model mesh designed for the accomplishment. Custom trophy models 107 may be awarded for major achievements or milestones or for eSport victories. By way of example and not by way of limitation, the custom model 107 shown is a car signifying a first-place finish in a particular race in a racing game. In some implementations the custom trophy model may be a unique or one-of-a-kind model and may be associated with a distributed ledger system such as a block chain. In some implementations the custom trophy models may include a model virtual item from an application such as a video game. By way of example, and not by way of limitation, trophies for events and competitions where there is single winner or set of single winners may be associated with a distributed ledger system to ensure uniqueness of the trophies. Furthermore, a distributed ledger could be used to ensure uniqueness of any awards associated with a trophy. For example the organizer of a competition may award the winner of a trophy may a unique skin for the winner's character or weapon. Such an award may be associated with a distributed ledger to ensure its uniqueness.

The display device 102 shown here is a smartphone display but aspects of the present disclosure are not so limited. By way of example and not by way of limitation the display may be a smart watch display, a head mounted display, a tablet computer display, a computer monitor, a television screen, a smart glasses display, a contact lens integrated display or any combination thereof.

Figure 2:
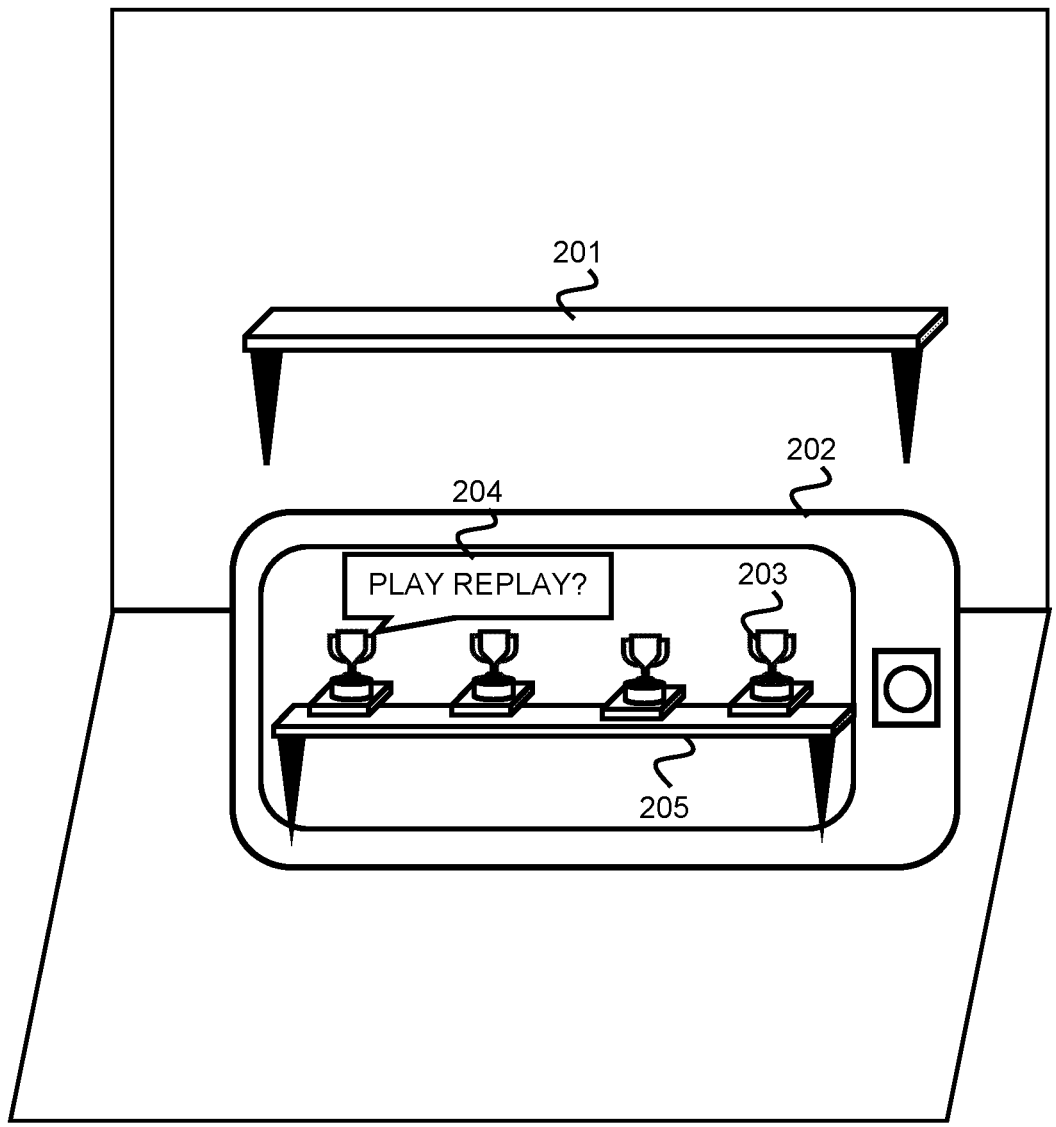
FIG. 2 is a pictorial diagram showing an implementation of an interactive augmented reality trophy system using a physical shelf as a virtual trophy rack according to aspects of the present disclosure.

FIG. 2 is a pictorial diagram showing an implementation of an interactive augmented reality trophy system using a physical shelf as a basis for a virtual trophy rack according to aspects of the present disclosure. Here, the surface 201 includes a shelf. The interactive augmented reality trophy system 202 may detect the shelf surface and use the shelf as a location anchor point for the trophy rack mesh. Alternatively, the user may select the shelf as an anchor point location. The trophy rack mesh may conform to the shelf 205 in the image frame 206 and may be transparent to the user allowing the trophies 203 to appear to be sitting on the shelf when the image frame is presented with a display device. The transparent trophy rack mesh 205 in this implementation may be used to locate the trophies to the shelf and may be for example and without limitation a skinless mesh of vertices outlining the shape of the shelf. One or more of the trophies 203 in this implementation are associated with additional information 204. Here the additional information about the trophy includes a link to a replay showing how the trophy was earned. In other implementations the additional information may include a description of how the trophy was earned and/or link to a screenshot of the moment when the trophy was earned. Additionally in some other implementations the trophy itself may include a replay showing a short video clip of the event where the trophy was earned or a screenshot of the moment when the trophy was earned. One or more of the trophies may also include an animated image or a moving model.

Figure 3:
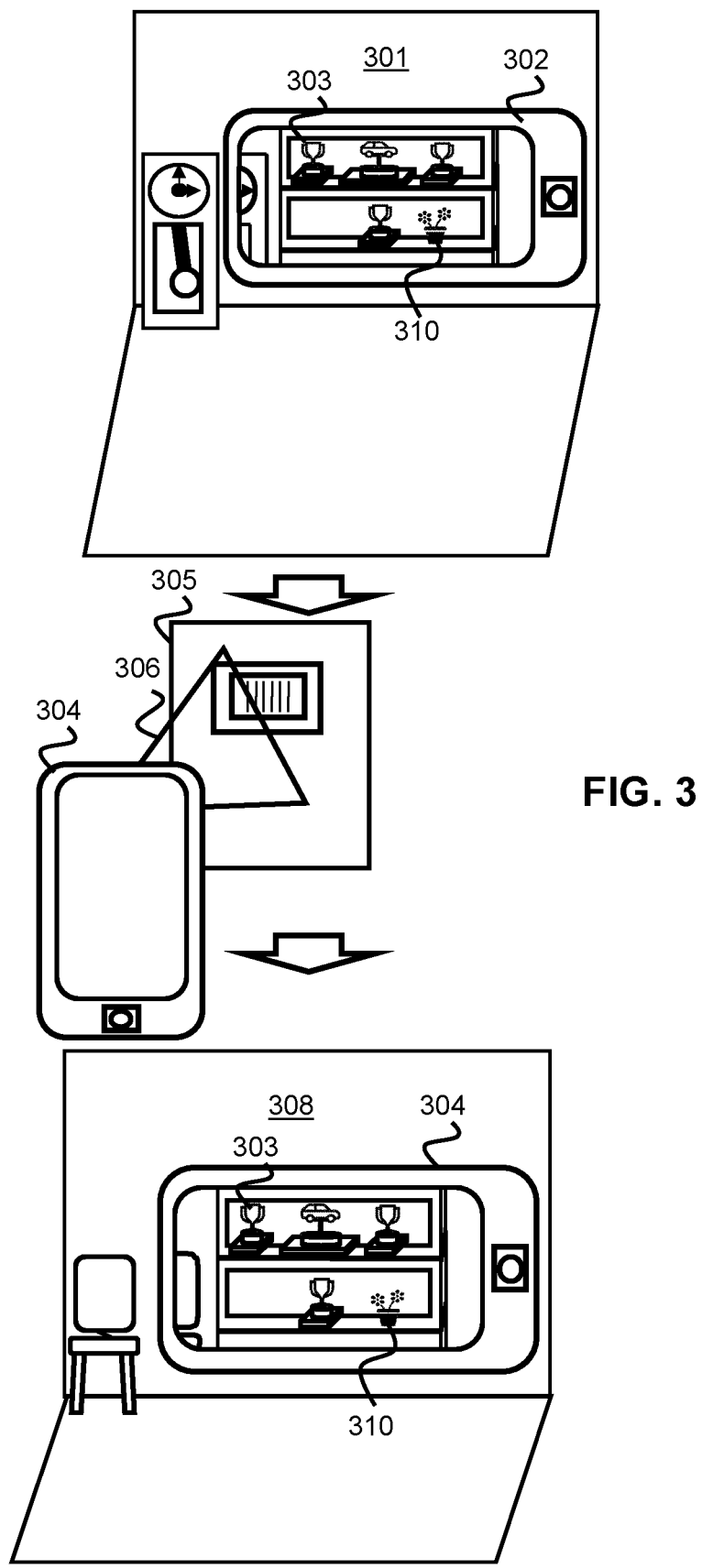
FIG. 3 is a pictorial diagram showing an implementation of an interactive augmented reality trophy system sharing the trophy rack and trophies with another device according to aspects of the present disclosure.

FIG. 3 is a pictorial diagram showing an implementation of an interactive augmented reality trophy system sharing the trophy rack and trophies with another device according to aspects of the present disclosure. In this implementation data about the location of trophies, the size and type of trophy rack, trophy type and other trophy information (referred to herein as trophy rack layout data or layout data) is shared allowing a second user to view the trophies and trophy rack arrangement of the first user without the second user having to travel to meet the first user. As shown a first user may arrange their trophies 303 on their trophy rack mesh using a display device 302. The display device 302 may include other parts of the interactive augmented reality system including an imager to scan the surface 301. Thus, as shown the display device 302 including an imager is pointed at the surface and the display shows the trophy rack on an image frame of the surface. The user may arrange the trophies 303 on the trophy rack mesh to their preferred arrangement. Additionally, besides trophies other item models and/or images 310 may be applied to the trophy rack mesh to improve the overall aesthetic of the trophy rack and make the trophy rack unique to the user. Other item models may be for example and without limitation other items that are not trophies such as a flower in a flower pot, toy cars, bookends, books, picture frames with or without images displayed on them, or similar items typically displayed on trophy racks or bookshelves. Trophy rack layout information may be saved to memory on the interactive augmented reality trophy system and/or sent to a second interactive augmented reality trophy system. The trophy layout information may include the location of trophies, the size and type of trophy rack, trophy type and other trophy information.

The trophy layout information may be sent from the first system to the second system via sharing the trophy layout information over a network or through a physical medium such as a compact disk, 3.5-millimeter diskette, solid state memory card, Universal Serial Bus (USB) storage drive, etc. In the implementation shown, the trophy layout information is uploaded to a remote server and a link to the layout information on the remote server is converted to a physical link 305 such as a barcode or a QR code. The second interactive augmented reality trophy system 304 may scan 306 the physical link 305 and the second system may follow the link and retrieve the trophy layout information from the remote server through the network.

Once the trophy layout information is retrieved, the second system may use the trophy layout information to regenerate the trophy rack mesh and trophy model layout created by the first system. The display device of the second system may display an image frame containing the trophies 303, trophy rack mesh, and trophy layout from the first system over a different surface 308 provided to the second system 304. The different surface may be provided to the second system by creating an image of the different surface using an imager associated with the second system. In this way the trophy rack, trophies and trophy layout may be viewable by a second user using a second system without the second user being physically present in the same room as the first user.

Figure 4:
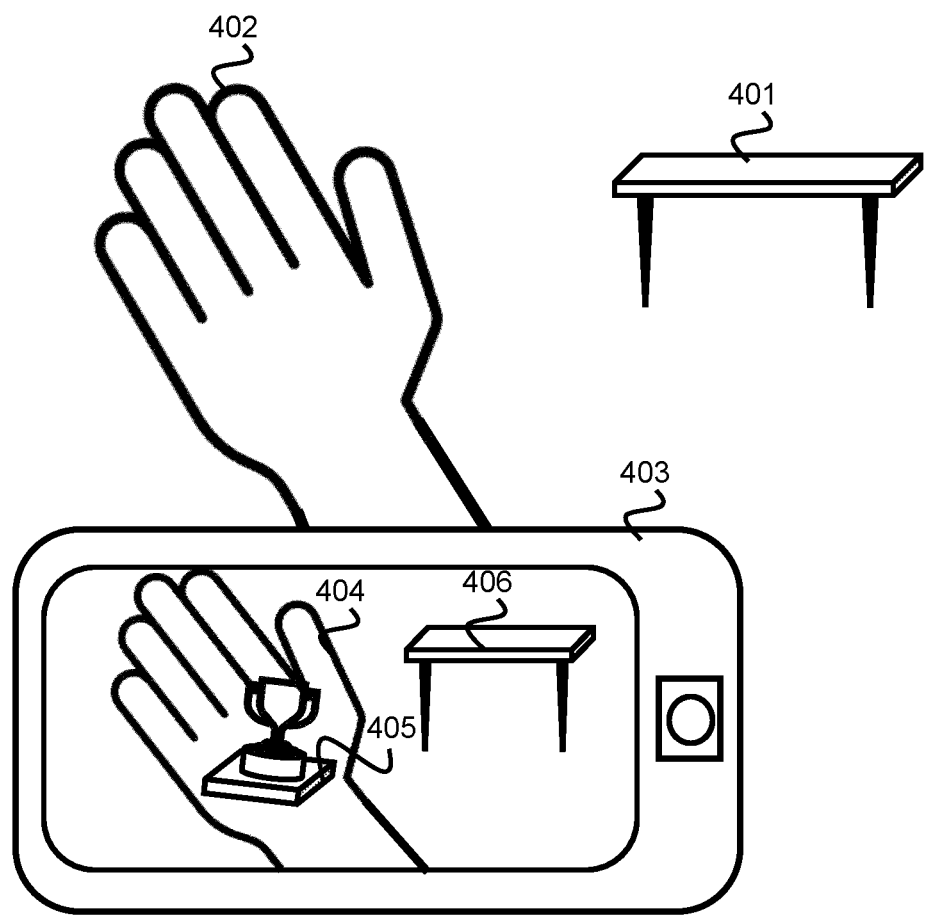
FIG. 4 is a pictorial diagram showing an implementation of an interactive augmented reality trophy system with user interaction according to aspects of the present disclosure.

FIG. 4 is a pictorial diagram showing an implementation of an interactive augmented reality trophy system with user interaction according to aspects of the present disclosure. As shown, a user may use their hand 402 or other appendage to interact with virtual trophies. An image of the user's hand 404 may be reproduced on the display device of the interactive augmented reality trophy system 403. The user may move their hand towards a surface 401 on which the trophy rack mesh 406 is anchored in virtual space. The system may detect a gesture from the user's hand indicating that the user wishes to pick up or interact with the trophy. If the user's gesture is a pick-up gesture the trophy may subsequently be displayed on or in the user's hand as shown with element 405. Alternatively other gestures made by the user may cause different interactions with the trophy for example and without limitation a quick push motion by the user may cause the system to apply a falling over animation to the trophy model or apply physics to the trophy model and simulate a collision with a simulated surface of the user's hand. To prevent accidental interaction with the trophy models on the trophy rack mesh, the trophy models may be static until the user enables physics or gestures in a specific gesture. When the user provides the specific gesture physics may be enabled with the trophy model. Additionally, the trophy model in the hand of the user may have physics applied or may have specific gestures that cause animations such as throwing the trophy model against a wall.

Figure 5:
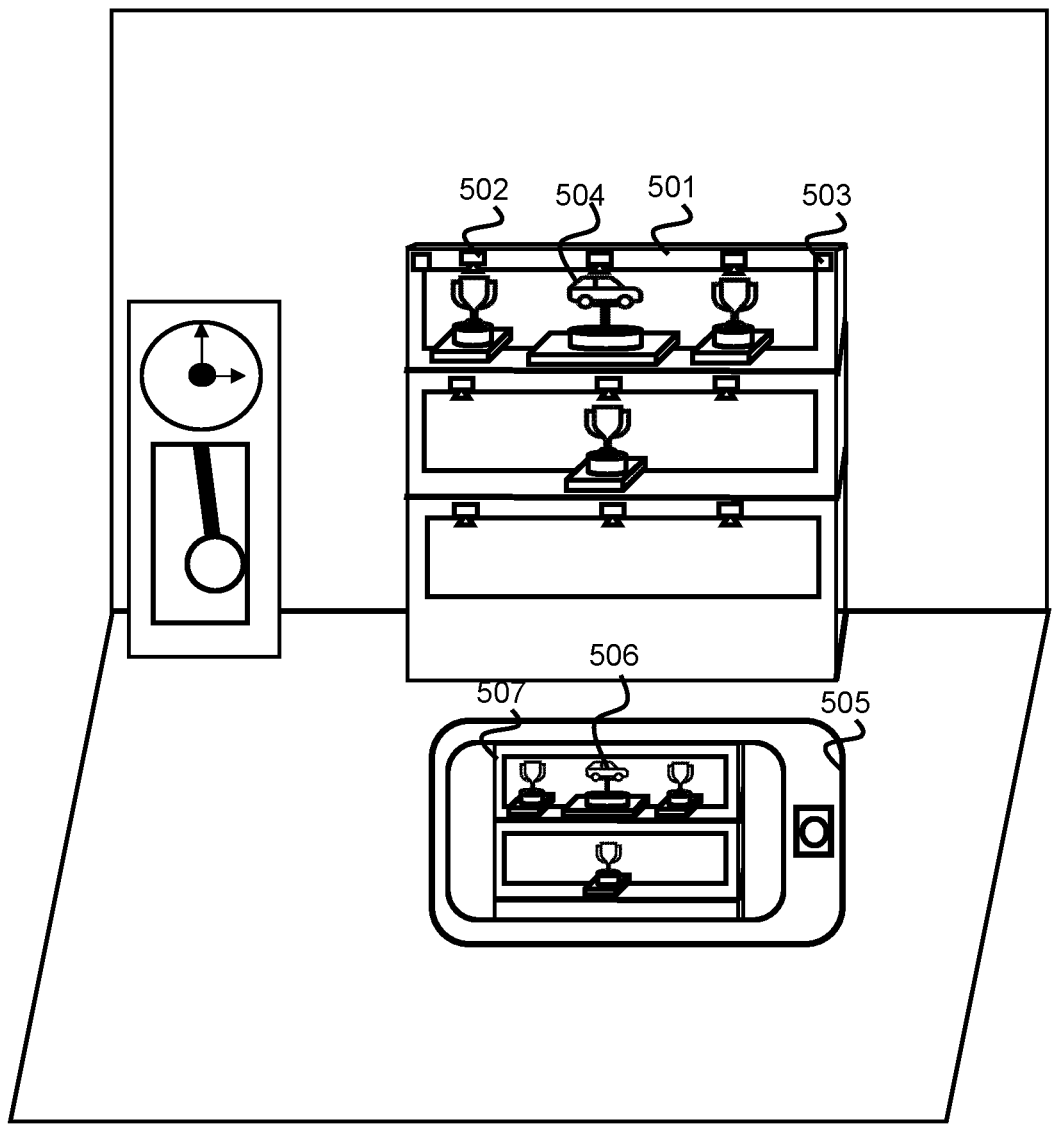
FIG. 5 is a pictorial diagram showing an implementation of an interactive augmented reality trophy system with a physical trophy rack displaying virtual trophies according to aspects of the present disclosure.

FIG. 5 is a pictorial diagram showing an implementation of an interactive augmented reality trophy system with a physical trophy rack displaying virtual trophies according to aspects of the present disclosure. In the implementation shown, a projector bookshelf 501 is used as an anchor location for the trophy rack mesh 507. The user may interact with the virtual trophies 506 displayed on the display device of the interactive augmented reality trophy system 505. The projector bookshelf 501 may be in communication with other elements of the interactive augmented reality trophy system and update the location of the virtual trophies each time the user arranges a trophy location.

The projector bookshelf 501 may include one or more short throw projectors 502 and projection surfaces on the shelves of the bookshelf. The short throw projector and bookshelves may be configured to make the projection of the trophies 504 appear three dimensional on the shelf. Additionally, the projector bookshelf 501 may include one or more location anchor points 503 to ensure that the trophy rack mesh 507 is accurately aligned with the projector bookshelf 507 in the image frame. The location anchor points 503 may also inform the display device 505 that the bookshelf is a projector bookshelf.

The system 505 may use the information about the bookshelf to ensure that the virtual trophies 506 are placed in valid locations near a short throw projector 502 for the projector bookshelf 501. Short throw projectors can be placed very close, e.g., about 2-3 feet or even a few inches, to a surface such as a wall, ceiling, or floor and project a large image on the surface. There are a number of different types of commercially available short throw projector technologies that can be easily adapted to project images on a surface more or less parallel to the surface. One advantage of a short throw projector is that it can be placed very close to the plane of the projection area, e.g., close to the wall, floor, bookshelf, etc. Such placement can greatly reduce the likelihood that the beam from the projector will project into a user's eyes. Another advantage short throw projectors over ceiling mounted projectors is that if there is less likelihood that the user will block the projector beam and cast a shadow. Since the projector 502 can be located in front of the user rather than behind the user the user is unlikely to see any shadow due to the user's body blocking the projector beam.

The system may include for example and without limitation a database that includes information for each compatible type of projector shelf about valid locations for trophies, trophy rack mesh that follows contours of the projector shelf and other information for accurate display of the trophies on the projector shelf. In this way the interactive augmented reality trophy system may properly display virtual trophies 506 with the projector bookshelf 501.

Figure 6:
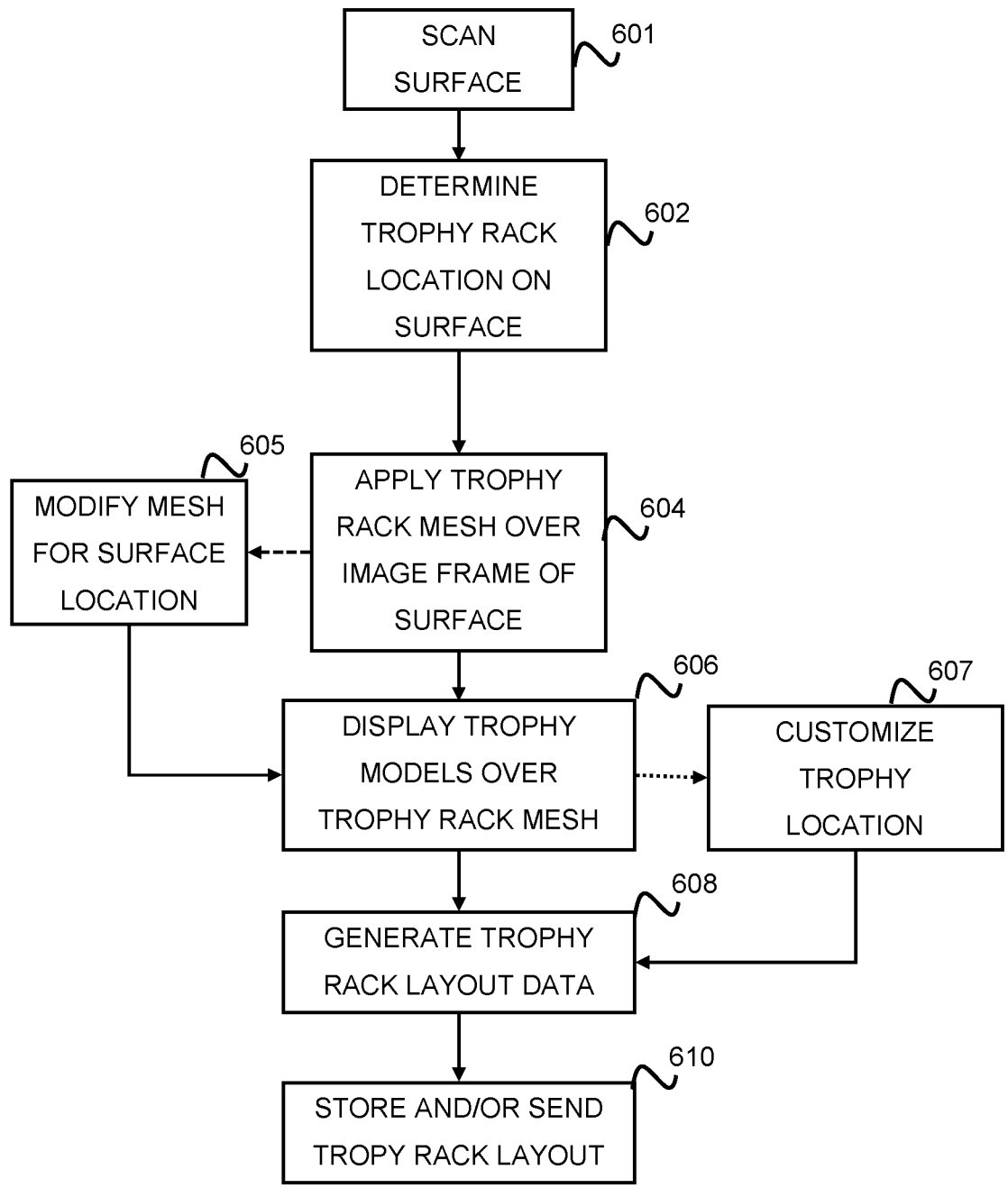
FIG. 6 is a flow diagram showing a method for generation of an interactive augmented reality trophy rack with trophies according to aspects of the present disclosure.

FIG. 6 is a flow diagram showing a method for generation of an interactive augmented reality trophy rack with trophies according to aspects of the present disclosure. Generation of the interactive augmented reality trophy rack with trophies initially starts with scanning a surface as indicated at 601. Scanning the surface may be accomplished by for example and without limitation generating an image frame of the surface using a camera or other imaging device such as an infrared emitter and infrared detector array or an ultrasonic transducer.

A location for the trophy rack mesh may be determined from the data generated by scanning the surface, as indicated at 602. For example, and without limitation, the surface may include one or more location anchor points which the system may use to establish attributes of the surface. Such attributes may include, contour of the surface, distance of the surface from imager, and viewing angle of the surface by the imager. Additionally internal information from sensors in the system may be used to further refine the attributes of the surface. The system's sensors may include one or more inertial measurement units (IMU) which may include accelerometers, gyroscopes, magnetometers and/or similar. Additionally, the system may receive global positioning system (GPS) coordinates over a wireless GPS signal or through a network connection. This information may be used to establish an accurate representation of the surface on which the mesh may be overlaid in the image frame and establish changes in the view of the surface and trophies or other virtual objects when the user moves the imager.

In some implementations the one or more location anchor points may include a fiducial marker coupled with the surface. For example, a fiducial marker such as a QR code may be affixed to the surface with a glue or other adhesive or fastener. The imager may be configured to read the QR code and use the known size and shape of the QR code to determine at least one attribute of the surface. The QR code may include encoded information about the surface and/or the QR code itself for example the QR code may have encoded information about the dimensions of the QR code.

In some alternative implementations the one or more location anchor points may include an active or passive marker. An active marker may emit a constant or periodic signal that is detectable by the augmented reality trophy system. Active markers may emit any type of signal suitable for detection but preferably the active marker emits a signal that is imperceptible to human senses. By way of example and not by way of limitation the active markers may emit infrared signals, ultrasonic signals, radiofrequency signals or other electromagnetic signals. The system may use the signal emitted by the active marker to determine one or more attributes of the surface. A passive marker reflects a signal generated by a signal source back to a receiver on the system. For example, a passive marker may be a retroreflector or a simple reflective surface. The system may use time of flight or phase-shift information determined from the signal emitted by the marker, from this information the distance of the imager from the surface may be determined. A signal emission source, for example and without limitation an infrared light source, may be coupled to the system and the receiver, the system may know the time of emission of the signal and use that time of emission to determine a time of flight and distance of the passive marker from the receiver. Additionally, three or more markers may be used to determine an angle or incline of the surface. For uneven surfaces multiple markers may be used to outline the contour of the surface, providing contour information to the system.

In yet another implementation the system may use the imager and simultaneous localization and mapping (SLAM) to generate information about attributes of the surface. In SLAM a 3D map of the surface and surroundings may be generated. Trained neural networks with machine learning algorithms may determine where the imager of the system is positioned within that 3D map, using feature detection to reconstruct and analyze the surface and surroundings. Additionally imaging techniques and feature detection methods like corner detection, blob detection, edge detection or thresholding, and other image processing methods may be used in mapping the surface and surroundings.

Once the location of the trophy rack has been determined including a map of the contour of the surface at the location for the trophy rack, a trophy rack mesh may be applied over the surface in an image frame as shown at 604. The trophy rack mesh may be skinned to create a visible model of the trophy rack or may be an unskinned collection of vertices representing the trophy rack. Additionally, the trophy rack mesh may be modified at 605, e.g., to conform to the contours of the surface or to better fit the size or incline of the surface. In some implementation the trophy rack mesh may be configured to completely conform to surface thus providing an appearance that a virtual item located on the trophy rack mesh is sitting on the surface.

Once a trophy rack mesh has been displayed over the surface, trophy models may be applied over the trophy rack mesh, as indicated at 606. The locations of the trophy models may be limited to certain areas of the trophy rack mesh to ensure that the trophies display properly. For example, the trophy locations may be limited to areas of the trophy rack mesh designated as a shelf or in the case of trophy rack model associated with a projection bookshelf, areas in view of a projector. Once a trophy has been localized to the trophy rack, additional effects may be added to the trophy models and/or trophy rack for example and without limitation shadows, lighting, dust effects and similar.

In some implementations the location of the trophies may be further customized after they are displayed on the trophy rack as shown at 607. The user may interact with the trophies by for example and without limitation picking up and moving the trophies with their hand or alternatively the user may change a setting in a user interface shown on the display of the system to change the location of one or more of the trophies.

Each time trophies are placed or relocated on the trophy rack mesh the system may generate trophy rack layout data 608. The trophy rack layout data may include information such as the location of each trophy on the trophy rack, information about each trophy model, and trophy rack mesh information. The trophy rack mesh information may include information used to generate the trophy rack mesh, for example and without limitation, mesh vertex locations, a trophy rack mesh size, a trophy rack shape, a trophy rack model, opacity, texture etc. In some implementations information about each trophy model may include a link to a database where the trophy model may be retrieved from or alternatively the information about each trophy model may be the trophy model itself. Additionally, the information about each trophy model may include additional information about, or links to information about, the trophy model such as a description of how the trophy was earned, a screenshot, a replay, a video of the event in which the trophy was earned, an animation and similar. In some implementations, information about the trophy may also include game-related data, such as a weapon used, type of character, time played, and the like.

Once the trophy rack layout data has been generated the trophy rack layout data may be stored in memory or sent to another system or a remote storage location 610.

Figure 7:
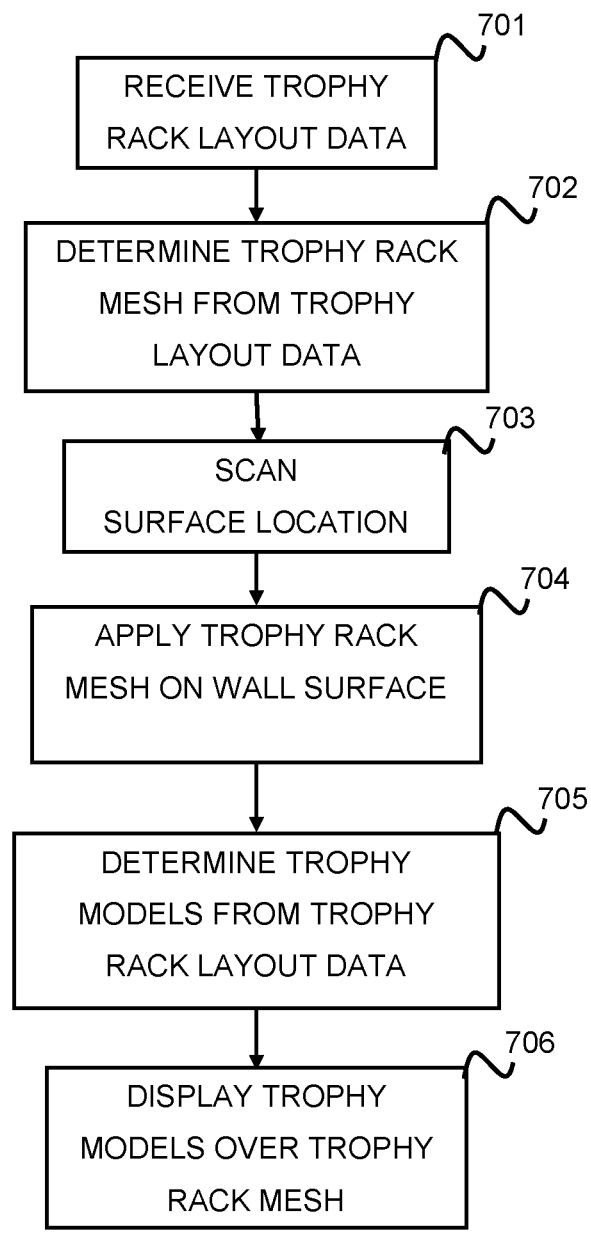
FIG. 7 is a flow diagram depicting a method for receiving and displaying an interactive augmented reality trophy in an interactive augmented reality trophy system according to aspects of the present disclosure.

FIG. 7 is a flow diagram depicting a method for receiving and displaying an interactive augmented reality trophy in an interactive augmented reality trophy system according to aspects of the present disclosure. Initially the interactive trophy rack system may receive trophy rack layout data at 701. The trophy rack layout data may be received from another augmented reality trophy system over a network connection or from a remote server over a network connection, or from data transfer media, e.g., compact disks, non-volatile flash memory cards etc. Once the trophy rack layout data has been received the trophy rack mesh may be determined from the trophy rack layout data, as indicated at 702. The trophy rack mesh may be generated from the trophy rack layout data.

After the trophy rack mesh is determined the system may scan a surface location for placement of the trophy rack mesh at 703. As discussed above with respect to element 601 of FIG. 6, scanning the surface may be accomplished by for example and without limitation generating an image frame of the surface using a camera or other imaging device such as an infrared emitter and infrared detector array or an ultrasonic transducer.

Once the surface location has been scanned the trophy rack mesh may be applied to an image frame of the surface location as indicated at 704. Similar to as discussed above with respect to element 602 of FIG. 6, one or more location anchor points which the system may use to establish attributes of the surface for application of the trophy rack mesh. The attributes of the surface may be used to ensure that the trophy rack mesh is properly displayed over the surface for example and without limitation the surface attributes may be used to ensure that a model having the trophy rack mesh maintains the proper relative size or aspect ratio in the image frame as established by the trophy rack layout data.

After the trophy rack mesh is applied to the surface of trophy models are determined from the trophy rack layout data at 705. The trophy rack layout data may include information that is used by the system to determine placement of one or more trophies on the trophy rack mesh such as, one or more mesh vertex locations covered by the model. Each trophy model may also be included in the trophy rack layout data or and/or information linking to a remote sever where the trophy models may be retrieved. Once the trophy models and locations for the trophy models have been determined, the trophy models may be displayed over the trophy rack mesh at 706. The scaling of the trophy rack mesh determined at 704 may be used to ensure that the trophies are properly displayed at the scale of the trophy rack. Additionally, other interactions using gestures may be possible, for example and without limitation a user may push a trophy to a valid shelf location by making a push gesture. The system may detect this push gesture and display the trophy moving along the path of motion with the user's hand on trophy rack mesh. In some implementations the system may be able to provide user interaction in the form of toppling over trophies. Each trophy may have an associated center of gravity and base width so that the trophy may be configured to topple over when a user's hand intersects the trophy model at a location far from the center. The system may display an animation of the model toppling over along a path of movement determined by analyzing motion of the user's hands. Alternatively in some implementations, the interactive trophy display system may include fully enabled physics simulation capabilities that can simulate the physics of a collision between the user's hand and the trophy model and animate the motion of the trophy according to the physics simulation.

Figure 8:
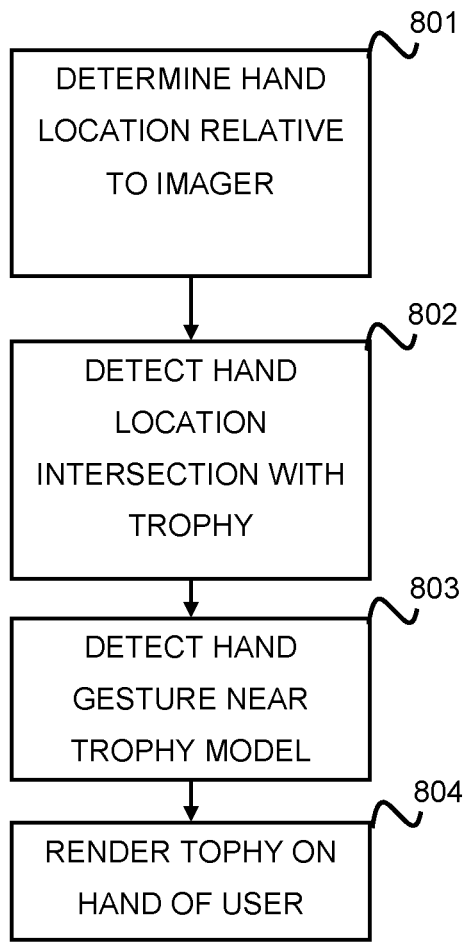
FIG. 8 is a flow diagram depicting a method for a user interaction of picking up a trophy model according to aspects of the present disclosure.

FIG. 8 is a flow diagram depicting a method for a user interaction of picking up a trophy model according to aspects of the present disclosure. After the trophy rack mesh and one or more trophies are displayed over the portions of the trophy rack mesh a user may be able to interact with the trophies using their hand. Initially the system may determine the location of the user's hand relative to an imager, as indicated at 801. The system may detect the user's hands using known hand detection techniques such as for example and without limitation a machine learning algorithm trained to perform image analysis to determine the location of the user's hands in relation to the imager from image that includes the user's hand or hands. Once the locations of the hands are determined relative to the imager the system may use the trophy layout data to determine the location of the hand relative to the trophy rack and one or more trophies displayed over the trophy rack. The relative locations of the trophies and trophy rack and the hand may then be used to detect and intersection between a trophy and the user's hand at 802. For ease of detection each trophy model may include a zone of interaction that encompasses the entire trophy model allowing an intersection between the hand location and the trophy in a general area near the trophy.

Once an intersection between a hand and a trophy model is detected the system may recognize a hand gesture, as indicated at 803. Examples of hand gestures may include, for example and without limitation, a grabbing motion, a pulling motion, a closing first motion or similar. The system may use any suitable image analysis and gesture detection method to detect when the user makes a gesture near the trophy. Gesture detection methods may include for example and without limitation, a machine learning algorithm with a neural network trained to detect hand gestures.

After detecting a hand gesture, the system may render the trophy on the hand of the user at 804. The system may apply an animation with the trophy to indicate that the user picked up the model and/or simulate the trophy model being picked up. Rendering the trophy on the hand of the user, may include for example rendering the trophy in a palm of the user's hand, clipping the trophy model through a user's fist, sifting on the user's fingers or similar. The system may use the hand detection techniques to determine the location of the user's hand and use that location to render the trophy model on the location of the user's hand. A hand mesh may be applied over the location of the user's hand or hands to simulate that the trophy is sitting on a three-dimensional hand.

Figure 9:
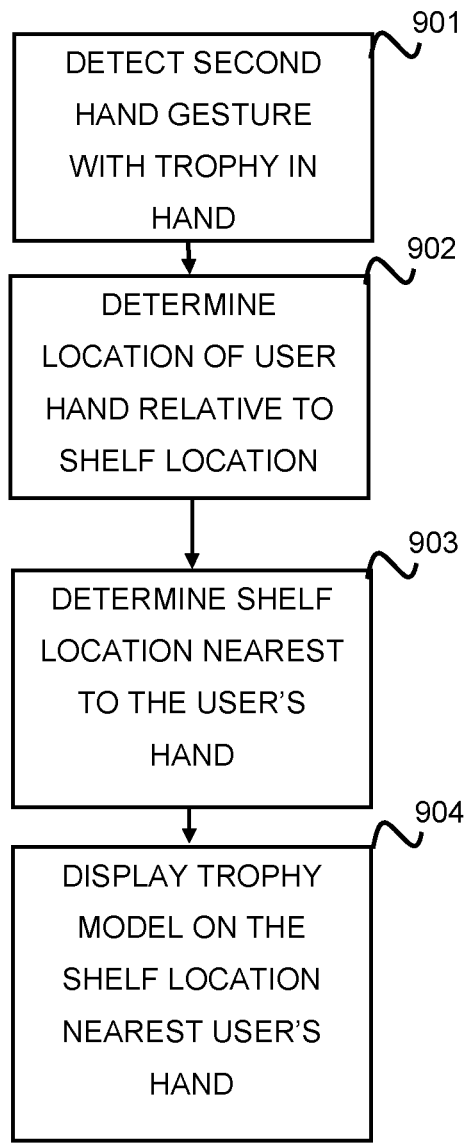
FIG. 9 is a flow diagram depicting a method for the user interaction of placing a trophy model according to aspects of the present disclosure.

FIG. 9 is a flow diagram depicting a method for a user interaction of placing a trophy model according to aspects of the present disclosure. Once a user has picked up a trophy model, they may want to place the trophy back on to the trophy rack. Initially, the system may detect a user making a second gesture while a trophy is being rendered on the hand of the user, as indicated at 901. The second gesture may be for example and without limitation, a hand opening motion, a downward item placement motion or similar. Similar to above, any suitable method of gesture detection may be used to determine the second gesture which may include for example and without limitation a machine learning algorithm with a neural network trained to detect gestures. After the second gesture has been detected the location of the user's hand may be detected in relation to the imager and, from the relative location of the user's hand to the imager, the location of the user's hand relative to the trophy rack may be determined at 902. Additionally, the system may also detect the closest valid placement locations on the trophy rack for trophies (hereinafter valid trophy placement locations are referred to as shelves or a shelf). The system may then determine a location on the shelf nearest the user's hand that is not already occupied by a trophy at 903. The system may use the trophy layout data to determine locations of existing trophies for hand placement of an additional trophy on the shelf.

After an empty location on a shelf near the user's hand has been determined the system may display the trophy model on the shelf in the empty location at 904. The system may play an animation using the trophy model to simulate the trophy being placed on the shelf. Additionally, once the trophy is displayed on the shelf it is no longer displayed on the hand of the user. This provides the user with the experience of interacting with the trophy by placing it on a shelf location and customizing the location of the trophy models by hand.

Figure 10:
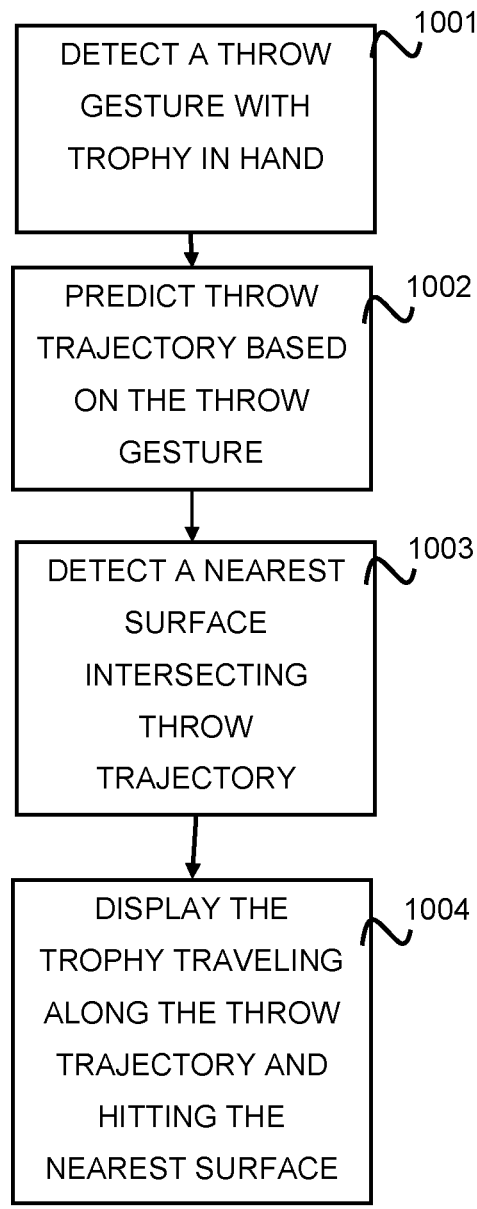
FIG. 10 is a flow diagram depicting a method for the user interaction of placing a trophy model according to aspects of the present disclosure.

FIG. 10 is a flow diagram depicting a method for the user interaction of placing a trophy model according to aspects of the present disclosure. Initially a throw gesture may be detected while a trophy is displayed in the user's hand at 1001. The throw gesture may be detected by any suitable gesture detection method for example and without limitation a machine learning algorithm with neural networks trained to detect a throw gesture from a sequence of images, e.g., video frames. Once a throw gesture is detected the system may predict a throw trajectory based on the arc made by the user's hand in the throw trajectory at 1002. Next, the system may use the predicted throw trajectory and SLAM surface mapping to detect surfaces that intersect the predicted throw trajectory at 1003. Once an intersection between a surface and the throw trajectory has been determined the trophy may be displayed in subsequent image frames travelling along the predicted throw trajectory at 1004. Once the trophy model intersects the surface on the throw trajectory a collision animation may be displayed according to simulated physics. For example and without limitation, the trophy animation may be an animation showing the trophy model shattering.

System

Figure 11:
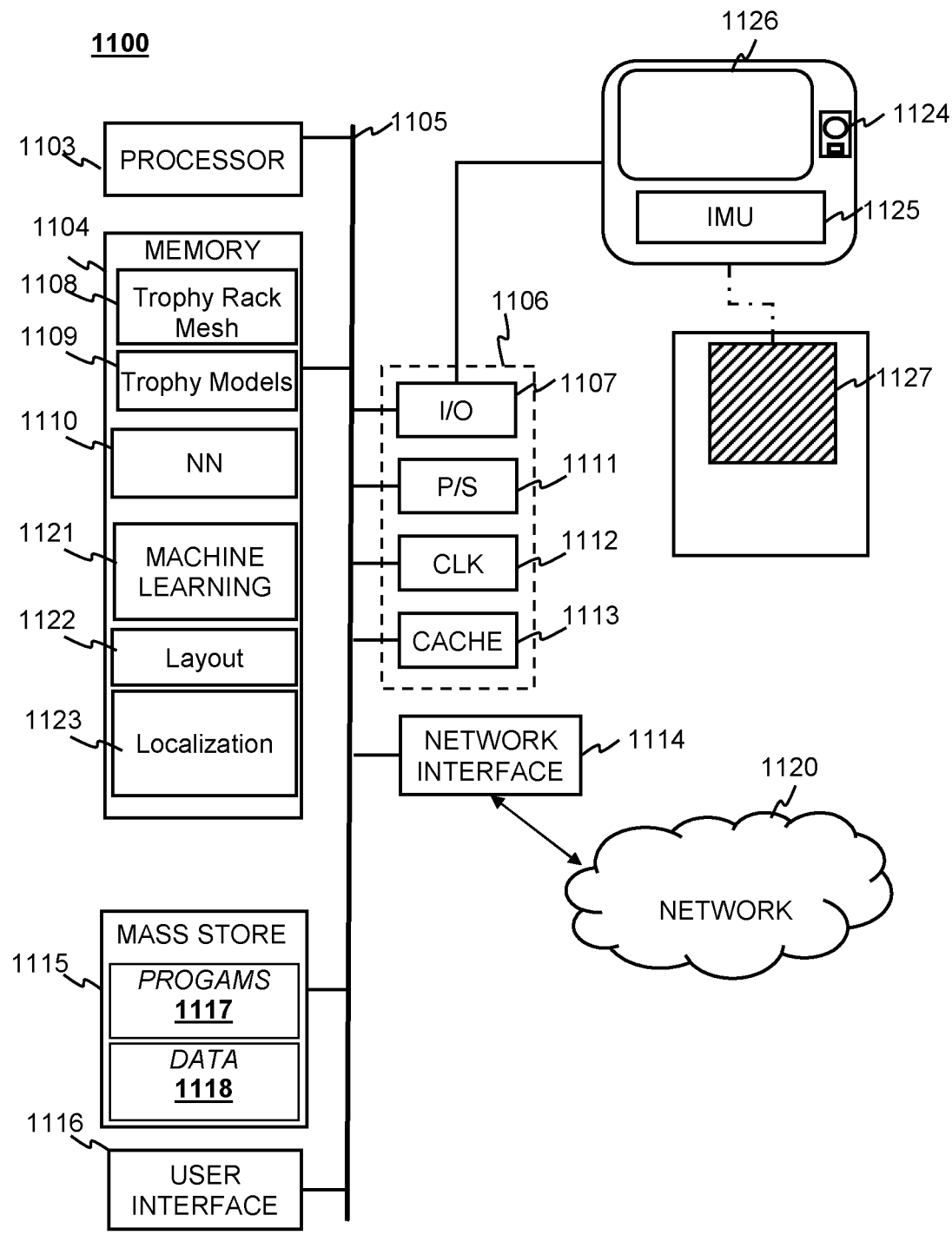
FIG. 11 is a block system diagram for an interactive augmented reality trophy system according to aspects of the present disclosure.

FIG. 11 is a block system diagram for an interactive augmented reality trophy system according to aspects of the present disclosure. By way of example, and not by way of limitation, according to aspects of the present disclosure, the system 1100 may be an embedded system, mobile phone, personal computer, tablet computer, portable game device, workstation, game console, and the like.

The system 1100 generally includes a central processor unit (CPU) 1103, and a memory 1104. The system 1100 may also include well-known support functions 1106, which may communicate with other components of the system, e.g., via a data bus 1105. Such support functions may include, but are not limited to, input/output (I/O) elements 1107, power supplies (P/S) 1111, a clock (CLK) 1112 and cache 1113.

The system 1100 may include a display device 1126 to present rendered graphics to a user. In alternative implementations, the display device is a separate component that works in conjunction with the system, 1100. As shown the display device 1126 may be coupled to the imager 1124. The display device may be in the form of a flat panel display, head mounted display (HMD), cathode ray tube (CRT) screen, projector, a smart watch display, a smart phone display, a computer monitor, a television screen, a smart glasses display, a contact lens integrated display or other device that can display visible text, numerals, graphical symbols, or images. Additionally, the system 1100 may include an image generator (also called an imager) 1124. The imager 1124 may generate one or more images 1109 that may be stored in the memory 1104. The image generator 1124 may be for example and without limitation, a camera, a video camera, a camera phone, a smartphone, a tablet personal computer having a camera, a web camera or similar. Additionally, the imager may be coupled to one or more IMUs 1125. The IMU 1125 may include accelerometers, gyroscopes, magnetometers and/or similar. The IMU 1125 may provide information to the system to establish an accurate representation of the surface on which the mesh may be overlaid in the image frame and establish changes in the view of the surface when the user moves the imager. As shown the display device 1126 may be both operably and mechanically coupled to the imager 1124. As used herein "operably coupled" includes the ability of the display device to present images obtained by the imager. As used herein "mechanically coupled" includes the ability of the imager and display device to maintain a fixed relative position and orientation with respect to each other. In some implementations the display device 1126 and imager 1124 may be both operably and mechanically coupled to each other by virtue of being incorporated into a common system, such as a digital camera, digital video camera, smart phone, tablet computer, and the like. In other implementations, the display device 1126 and imager 1124 may be mechanically coupled by virtue of being attached to a common frame or other structure and operably coupled via a data bus or network either to each other or to a common system. In still other implementations, the display device 1126 and imager 1124 may be separate devices not mechanically coupled to each other but still operably coupled to each other via personal area network (e.g., Bluetooth®), local area network (LAN) or wide area network (WAN).

In some implementation, e.g., if the they are mechanically coupled, when the display device 1126 is moved the imager 1124 may move and the system may detect this movement and change a location of the virtual camera view of trophy rack mesh and trophy enhancing the three-dimensional effect of the virtual trophy models. The virtual camera may be placed so that is in an identical location as the imager and changes location with a change in real world location of the imager. Additionally, the system may use one or more location anchor points to determine a surface location and optionally the one or more location anchor points may include one or more land marks 1127 coupled to the system through the imager 1124 or through a network 1120 (not shown). The one or more landmarks may be labels bearing a fiducial marker, a light house configured to emit radiation or a sound signal detectable by the imager, a physical object recognizable by the augmented reality system or any combination thereof.

The system 1100 includes a mass storage device 1115 such as a disk drive, CD-ROM drive, flash memory, solid state drive (SSD), tape drive, or the like to provide non-volatile storage for programs and/or data. The system 1100 may also optionally include a user interface unit 1016 to facilitate interaction between the system 1100 and a user. The user interface 1116 may include a keyboard, mouse, joystick, light pen, game pad or other device that may be used in conjunction with a graphical user interface (GUI). The system 1100 may also include a network interface 1114 to enable the device to communicate with other devices over a network 1120. The network 1120 may be, e.g., a local area network (LAN), a wide area network such as the internet, a personal area network, such as a Bluetooth network or other type of network. These components may be implemented in hardware, software, or firmware, or some combination of two or more of these. Additionally, the system may be configured to receive GPS information over the network.

The CPU 1103 may each include one or more processor cores, e.g., a single core, two cores, four cores, eight cores, or more. In some implementations, the CPU 1103 may include a GPU core or multiple cores of the same Accelerated Processing Unit (APU). The memory 1104 may be in the form of an integrated circuit that provides addressable memory, e.g., random access memory (RAM), dynamic random-access memory (DRAM), synchronous dynamic random-access memory (SDRAM), and the like. The main memory 1104 may include application data 1123 used by the processor 1103 while processing. The main memory 1104 may also include images 1109 received from an imager 1124. One or more trained Neural Networks (NN) 1110 may be loaded into Memory 1104 for determination of surface location, hand locations and gesture. Additionally, the Memory 1104 may include machine learning algorithms 1121 for training or adjusting the NN 1110. Trophy rack layout data 1022 may be included in the memory 1104. Trophy rack layout 1122 may contain location of each trophy on the trophy rack, information about each trophy model, trophy rack mesh information. The trophy rack mesh information may include information used to generate the trophy rack mesh, for example and without limitation, mesh vertex locations, a trophy rack mesh size, a trophy rack shape, a trophy rack model, opacity, texture etc. The memory may also contain one or more trophy rack meshes 1008. The trophy rack meshes may either be an unskinned collection of vertices or a skinned model of a trophy rack. Other localization information 1123 may also be stored in memory 1104. The other localization information may include information used to determine a map of a surface for example algorithms to triangulate the location of location anchor points, or generate GPS coordinates.

The Mass Storage 1115 may contain Applications or Programs 1117 that are loaded into the main memory 1104 when processing begins on the application 1123. Additionally, the mass storage 1115 may contain data 1118 used by the processor during processing of localization 1123, NN 1110, machine learning algorithms 1121, and trophy rack layouts 1122.

Aspects of the present disclosure provide users with a shareable and immersive experience of their virtual world achievements. In particular, users can display, share and even manipulate in-game trophies using a custom AR system associated with a gaming platform.

While the above is a complete description of the preferred embodiment of the present invention, it is possible to use various alternatives, modifications, and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method for interactive display of virtual trophies, comprising:
   a) scanning a surface for one or more location anchor points;
   b) determining trophy rack location using the location anchor points;
   c) applying a trophy rack mesh over an image frame of the surface using the determined trophy rack location;
   d) displaying one or more trophy models over the trophy rack mesh with a display device including customizing one or more trophy model locations with respect to the trophy rack mesh wherein customizing one or more trophy model locations with respect to the trophy rack mesh includes using a user's hand location to cause the system to apply a falling over animation to the trophy model, wherein the one or more trophy models are static until physics interactions are enabled with a specific gesture;
   e) generating trophy rack layout information from the one or more trophy models and the trophy rack mesh;
   f) storing or transmitting the trophy rack layout information.

2. The method of claim 1 wherein displaying the trophy rack mesh over the image frame further comprises modifying the trophy rack mesh to fit the surface using the location anchor points.

3. The method of claim 1 wherein customizing the one or more trophy model locations with respect to the trophy rack includes using the user's hand location to change a location of one or more trophy models.

4. The method of claim 3 wherein using a user's hand location to change the location of one or more trophy models includes, determining the user's hand location relative to the trophy model, detecting an intersection between the hand location and the trophy location, detecting a first gesture made by the user's hands and displaying one or more trophy models on the user's hand.

5. The method of claim 4 further comprising detecting a second hand gesture made by the user's hand when the one or more trophy models are displayed on the user's hand, determining the location of the user's hand relative to the location of the trophy rack, determining a shelf location in the trophy rack nearest the user's hand, and displaying the trophy on the shelf location nearest the user's hand after detecting the second hand gesture.

6. The method of claim 4 further comprising detecting a throw gesture made by the user's hand when one or more trophy models are displayed on the user's hand, predicting a throw trajectory based on the throw gesture, detecting a nearest surface intersecting the throw trajectory and displaying the trophy traveling along the throw trajectory and hitting the nearest surface intersecting the throw trajectory.

7. The method of claim 1 wherein the one or more location anchor points include one or more fiducial markers coupled to the surface.

8. The method of claim 1 wherein the surface is a wall, or a floor.

9. The method of claim 1 wherein the trophy rack mesh conforms to a shape of the surface and the displayed trophy rack mesh is transparent to the surface.

10. The method of claim 9 wherein the surface is a shelf or a bookcase.

11. The method of claim 1 wherein the trophy model includes an animation.

12. The method of claim 1 wherein the trophy model includes a replay of a videogame.

13. The method of claim 1 wherein the trophy model is linked to information about the trophy including a description of how the trophy was earned.

14. The method of claim 1 wherein applying a trophy rack mesh over an image frame includes displaying a trophy rack model corresponding to the trophy rack mesh.

15. The method of claim 1 wherein the trophy model includes a model of a virtual item.

16. The method of claim 1 wherein the trophy model is associated with a distributed ledger.

17. A system for interactive display of virtual trophies, comprising:
   a processor;
   a display coupled to the processor
   an imager coupled to the processor;
   a memory coupled to the processor;
   non-transitory instructions embodied in the memory and configured cause the processor to carry out a method for interactive display of virtual trophies comprising:
   a) scanning a surface for one or more location anchor points;
   b) determining trophy rack location using the location anchor points;
   c) applying a trophy rack mesh over an image frame of the surface using the determined trophy rack location;
   d) displaying one or more trophy models over the trophy rack mesh with the display device including customizing one or more trophy model locations with respect to the trophy rack mesh wherein customizing one or more trophy model locations with respect to the trophy rack mesh includes using a user's hand location to cause the system to apply a falling over animation to the trophy model, wherein the one or more trophy models are static until physics interactions are enabled with a specific gesture;
   e) generating trophy rack layout information from the one or more trophy models and the trophy rack mesh;
   f) storing trophy rack layout information in the memory or transmitting the trophy rack layout information.

18. The system of claim 17 wherein the display includes one or more of a smart watch display, a head mounted display, a smart phone display, a computer monitor, a television screen, a smart glasses display and a contact lens integrated display.

19. A non-transitory computer readable medium having instructions embedded thereon, the instructions when executed by a computer cause the computer to carry out a method for interactive display of trophies comprising:
   a) scanning a surface for one or more location anchor points;
   b) determining trophy rack location using the location anchor points;
   c) applying a trophy rack mesh over an image frame of the surface using the determined trophy rack location;
   d) displaying one or more trophy models over the trophy rack mesh with a display device including customizing one or more trophy model locations with respect to the trophy rack mesh wherein customizing one or more trophy model locations with respect to the trophy rack mesh includes using a user's hand location to cause the system to apply a falling over animation to the trophy model, wherein the one or more trophy models are static until physics interactions are enabled with a specific gesture;
   e) generating trophy rack layout information from the one or more trophy models and the trophy rack mesh;
   f) storing or sending the trophy rack layout information.

* * * * *